United States Patent [19]
Sogabe et al.

[11] Patent Number: 5,390,506
[45] Date of Patent: Feb. 21, 1995

[54] ELECTRIC POWER SUPPLY APPARATUS OF AIR CONDITION CONTROL MACHINE

[75] Inventors: Masaharu Sogabe; Kiyoshi Shima; Keiichi Yoshisaka; Hisashi Sumida, all of Osaka, Japan

[73] Assignee: Daikin Industries, Ltd., Osaka, Japan

[21] Appl. No.: 94,125

[22] PCT Filed: Dec. 8, 1992

[86] PCT No.: PCT/JP92/01598
§ 371 Date: Jul. 30, 1993
§ 102(e) Date: Jul. 30, 1993

[87] PCT Pub. No.: WO/9312393
PCT Pub. Date: Jun. 24, 1993

[30] Foreign Application Priority Data
Dec. 9, 1991 [JP] Japan .................... 3-324588

[51] Int. Cl.⁶ ............................... F24F 11/02
[52] U.S. Cl. ........................ 62/175; 62/298; 62/230
[58] Field of Search ............. 62/175, 230, 298, 203, 62/126; 236/51, 1 B; 165/22, 11.1

[56] References Cited

U.S. PATENT DOCUMENTS

| | | | |
|---|---|---|---|
| 4,811,897 | 3/1989 | Kobayashi et al. | 236/51 X |
| 5,005,366 | 4/1991 | Murashige | 62/298 X |
| 5,065,813 | 11/1991 | Berkeley et al. | 62/298 X |

FOREIGN PATENT DOCUMENTS

| | | |
|---|---|---|
| 61-231342 | 10/1986 | Japan . |
| 2-85634 | 3/1990 | Japan . |
| 285634 | 3/1990 | Japan . |
| 2-272252 | 11/1990 | Japan . |

*Primary Examiner*—Harry B. Tanner
*Attorney, Agent, or Firm*—Sixbey, Friedman, Leedom & Ferguson

[57] ABSTRACT

An air condition control unit is provided with an EE-PROM previously memorizing respectively different specific numbers of indoor control units and power supply means. Further provided thereto are power supply judging means for judging whether a remote controller receives the power from another indoor control unit by monitoring power source lines, and power not-supply determining means for determining the unit of its own to be a unit which does not supply the power to the remote controller when the power supply judging means judges the remote controller receives the power. In addition, provided thereto are power supply timing means for setting a power supply timing based on the specific numbers and power supply determining means for determining the unit of its own to be a unit which supplies the power to the remote controller for making the power supply means supply the power to the remote controller when the power supply judging means judges the remote controller to be in a state that no power is supplied thereto at the power supply timing by the timing means. Consequently, the indoor control units are standardized and the power can be without failure supplied to the remote controller.

4 Claims, 12 Drawing Sheets

ELECTRIC POWER SUPPLY APPARATUS OF AIR CONDITION CONTROL MACHINE

TECHNICAL FIELD

This invention relates to an electric power supply apparatus for an air conditioning control machine which has a controller and an air conditioning control unit.

BACKGROUND ART

Generally, as disclosed in Japanese Patent Application Laying Open Gazette No. 2-85634, an air conditioner has been disclosed, in which a single remote controller is connected to a plurality of indoor control units for respectively controlling a plurality of indoor units so that control signals such as operation signals are sent and received between the remote controller and each of the indoor control units to control an air conditioning operation.

Between each indoor control unit and the remote controller, electric power is supplied from a previously designated indoor control unit to the remote controller. In addition, an address of each indoor control unit is set and data including error signals, wind direction signals and the like may be transmitted therebetween.

In the above mentioned air conditioning control machine, the address of the indoor control unit that supplies electric power to the remote controller is conventionally set to 0 by the remote controller. However, power cannot be supplied to the remote controller by the power supply unless the power supply's address is set to each indoor control unit. This creates a communication problem wherein communication is not performed between the remote controller and the indoor control unit such that the address is not automatically set.

One solution is for the address of the control unit that powers the remote controller to be previously set in hardware. This, however, requires that a printed circuit board be manufactured individually so that the indoor control units cannot be standardized.

In view of the above mentioned problems, it is an object of the present invention to supply electric power to the controller in a stable manner, by standardizing the air conditioning control units.

DISCLOSURE OF INVENTION

To attain the foregoing object, in the present invention, an air conditioning control unit for supplying electric power is determined using a specific number previously set with respect to each air conditioning control unit.

Specifically, as shown in FIG. 1, an electric power supply apparatus of an air conditioning control unit 2, according to a first embodiment of the invention, includes a plurality of air conditioning control units 2 connected to a single controller 3 via wirings 52 through which control signals between the remote controller 3 and the air conditioning indoor control units 2 are sent and received to control air conditioning operation.

Provided at each air conditioning control unit 2 are number memory means 24, for previously memorizing different specific numbers corresponding to the respective air conditioning control units 2; power supply means 51 for supplying electric power; power supply judging means (or power-on means) 21a, for detecting whether another air conditioning control unit 2 is powering the controller 3, which is done by monitoring the wirings 52; power control means (or no-power-supply means) 21b for determining to not supply electric power to the controller 3, which is when the power supply judging means (or power-on means) 21a detects that the controller 3 is being powered; timing means 21c, for setting a power supply time based on a specific number; and power supply determining means (or power activation means) 21d for determining to supply electric power to the controller 3, which is when the power supply judging means (or power-on means) 21a detects that the controller 3 is not being powered at the time established by the timing means 21c and for enabling the power supply means 51 to supply electric power to the controller 3.

As in the first embodiment, a second embodiment of the present invention discloses an electric power supply apparatus for an air conditioning control machine. As shown in FIG. 2, each air conditioning control unit 2 includes number memory means 24 for previously storing a specific number assigned to each of the air conditioner control units 2, and which is different for each air conditioning control unit 2; a power supply means 51 for supplying electric power to the remote controller 3; a power supply judging means (or power-on means) 21a for detecting, through monitoring of the wirings 52, whether another air conditioning control unit 2 is supplying electric power to the controller 3; and a power control means (or no-power-supply means) 21b for determining not to supply electric power to the remote controller 3, which is when the power supply judging means (or power-on means) 21a detects that the remote controller 3 is powered. The air conditioning control unit 2 further includes timing means 21f for setting a time for powering the remote controller 3 by the control units 2 based on one of a pluralality of sectional numbers that result from the mathematical division of the specific number stored in the number memory means 24; fixed power supply means 21g for enabling the power supply means 51 to supply electric power to the remote controller 3 at the time set by the timing means 21f; and power supply determining means (or power activation means) 21h for determining to supply electric power to the controller 3, which is when the fixed power supply means 21g enables the power supply means 51 as per all the sectional numbers obtained from the mathematical division of each one of the control unit's 2 preassigned numbers, respectively.

In an electric power supply apparatus for an air conditioning control machine according to the first and second embodiments, in addition to the above discussed elements, the invention provides a power supply stop means (or power interrupting means) 21e for stopping the power supply when an irregularity in the power supply is detected.

A third embodiment of the invention includes, as in the first embodiment, an electric power supply apparatus of an air conditioning control machine as shown in FIG. 3. The air conditioning control unit 2 comprises: number memory means 24 for previously storing a different specific number corresponding to each of the air conditioner control units 2; power supply means 51 for supplying electric power to the remote controller 3; power supply judging means (or power-on means) 21a for detecting, by monitoring of the wirings 52, whether another air conditioning control unit 2 is powering the controller 3; and first power control means (or no power-supply means) 21b for determining the air conditioning control unit 2 is not to power the controller 3, which is when the power supply judging means (or power-on means) 21a detects that the controller 3 is receiveing electric power. In addition, the air conditioning control unit 2 further includes timing means 21f for setting a time of power supply based on each one of plural sectional numbers resulting from a mathematical division of the specific number corresponding to each air conditioning control unit 2; fixed power supply means 21g for enabling the power supply means 51 to supply electric power to the remote controller 3 at a time pre-set as per the timing means 21f; and power supply notice means 21i for sending a notice signal of a predetermined voltage when the fixed power supply means 21g begins powering the controller 3. Further, the air conditioning control unit 2 features a second power control means (or no-power-supply means) 21j for determining not to supply electric power to the controller 3, which is when a notice signal is detected from another air conditioning control unit when monitoring the wirings 52; power supply stop means (or power interrupting means) 21e for stopping the power supply of the fixed power supply means 21g at a time determined by the pre-set time assigned to a specific control unit's 2 power supply when an irregularity of the power source is detected by monitoring the wirings 52; and power supply determining means (or power activation means means) 21h for determining to supply electric power to the remote controller 3, which is when the fixed power supply means 21g brings a normal power supply for all the air conditioning control unit's sectional numbers.

In the first embodiment, the power supply judging means (or power-on means) 21a detects whether electric power is supplied to the remote controller 3 from another air conditioning control unit 2 when a power source is turned ON. When the power supply judging means (or power-on means) 21a detects that the controller 3 is receiving power, the power control means (or no-power-supply means) 21b determines that the air conditioning unit shall not supply electric power. If the remote controller 3 is not receiving power, the timing means 21c sets a time for power supply based on the specific number previously given to each air conditioning control unit 2. For example, the timing means 21c sets the time of power supply by multiplying the specific number by 10 ms. Then, when the power supply judging means (or power-on means) 21a detects that the controller 3 is not receiving power at the pre-set time, the power supply determining means (or power activation means) 21d determines the air conditioning control unit 2 to be a unit which supplies electric power to the controller 3. When the power is supplied to the controller 3 from the power supply means 51, a control signal is sent and received between each air conditioning control unit 2 and the controller 3.

In the second embodiment, as in the first embodiment, the power supply judging means (or power-on means) 21a detects if the remote controller 3 is receiving power from another air conditioning control unit 2 when a power source is turned ON. When the power supply judging means (or power-on means) 21a detects that the controller 3 is receiving power, the power control means (or no-power-supply means) 21b determines to not supply electric power.

On the other hand, if the remote controller 3 is not being powered, the timing means 21f sets a time for power supply based on the plural sectional numbers obtained from the mathematical division of a 24-bit specific number given to each air conditioning controller 3. For example, the timing means 21f designates three different numbers which correspond to times for power supply which are obtained by multiplying the above mentioned 24-bit specific number by 10 ms per sectional number of 1 byte thereof. Then, the fixed power supply means 21g powers the remote controller 3 at the given times of power supply.

When another air conditioning control unit 2 supplies electric power to the remote controller 3 between the times of power supply, the power control means (or no-power-supply means) 21b determines to not supply electric power. On the other hand, if electric power is normally supplied, the power supply determining means (or power activation means) 21h enables the air conditioning control unit 2 to supply electric power from the unit's power supply means 51 to the controller 3, and a control signal is sent and received between each air conditioning control unit 2 and the controller 3. When there is some irregularity with the power source at each of the power supply times, the power supply stop means (or power interrupting means) 21e stops the power supply.

In the third embodiment, as well as in the second embodiment, the power supply judging means (or power-on means) 21a detects whether electric power is supplied from another air conditioning control unit 2 to the controller 3. When the power supply judging means (or power-on means) 21a detects that the controller 3 receives the power, the first power control means (or first no-power-supply means) 21b determines to not supply electric power. If the controller is not powered, the timing means 21f sets times of power supply based on the plural sectional numbers obtained by a mathematical division of the individual specific number of each air conditioning control unit. Then, the fixed power supply means 21g powers the controller 3 at the corresponding pre-set time, and the power supply notice means 21i sends a notice signal indicating that power has been supplied.

When the power is supplied from another air conditioning control unit 2 to the controller between the times of power supply, the first power control means (or first no-power-supply means) 21b determines to not supply electric power. At the time when the notice signal is output from another air conditioning control unit 2, the second power control means (or second no-power-supply means) 21j determines to not supply electric power. If there is an irregularity with the power source at each of the power supply times, the power supply stop means (or power interrupting means) 21e stops the power supply of the fixed power supply means 21g. If there is no irregularity, the power supply determining means (or power activation means) 21h enables the particular air conditioning control unit 2 to power the controller 3; the power is supplied from the air conditioning control unit's power supply means 51 to the controller 3, and a control signal is sent and received between each air conditioning control unit 2 and the controller 3.

The first embodiment ensures that power is supplied to the remote controller 3 when necessary, since a pre-set number is given to each air conditioning control unit 2 and will enable the supply of power at the appropriate time. Therefore, communication between the remote controller 3 and the air conditioning control units 2 is steadily established. Further, each address of the indoor control unit 2 can be automatically set, and printed circuit boards of the air conditioning control units 2 can be standardized thus facilitating the air conditioning control unit's manufacture.

The second embodiment ensures a rapid selection of the air conditioning control unit 2 that is to supply electric power to the remote controller 3, since the time of power supply is determined by a mathematical division of the pre-assigned individual specific number into plural numbers.

According to the third embodiment, since the power supply to the remote controller 3 is detected by a notice flag 21i, even when the power supply of the fixed power supply means 21g occurs simultaneously with that of another air conditioning control unit, the air conditioning control unit supplying power to the controller 3 can be identified based on a mathematical difference between the specific numbers.

BRIEF DESCRIPTION OF DRAWINGS

FIG. 4 is a diagram showing an arrangement of an air conditioner system, FIG. 5 is a circuit block diagram showing a construction of the air conditioner, FIG. 6 is a circuit block diagram showing a power supply circuit, and FIG. 7 is a control flow chart showing the operation of a power supply.

FIG. 8 is a diagram of a bit arrangement indicating a specific number, and FIG. 9 is a control flow chart showing the operation of a power supply.

FIG. 10 is a circuit block diagram showing a power supply circuit; FIG. 11 is a diagram showing an arrangement of the sectional numbers obtained from each individual specific number assigned to each air conditioning controller 3; FIG. 12 is a timing chart of power supply operations; and FIG. 13 is a control flow chart showing the operation of a power supply.

BEST MODE FOR CARRYING OUT THE INVENTION

Figure 1:
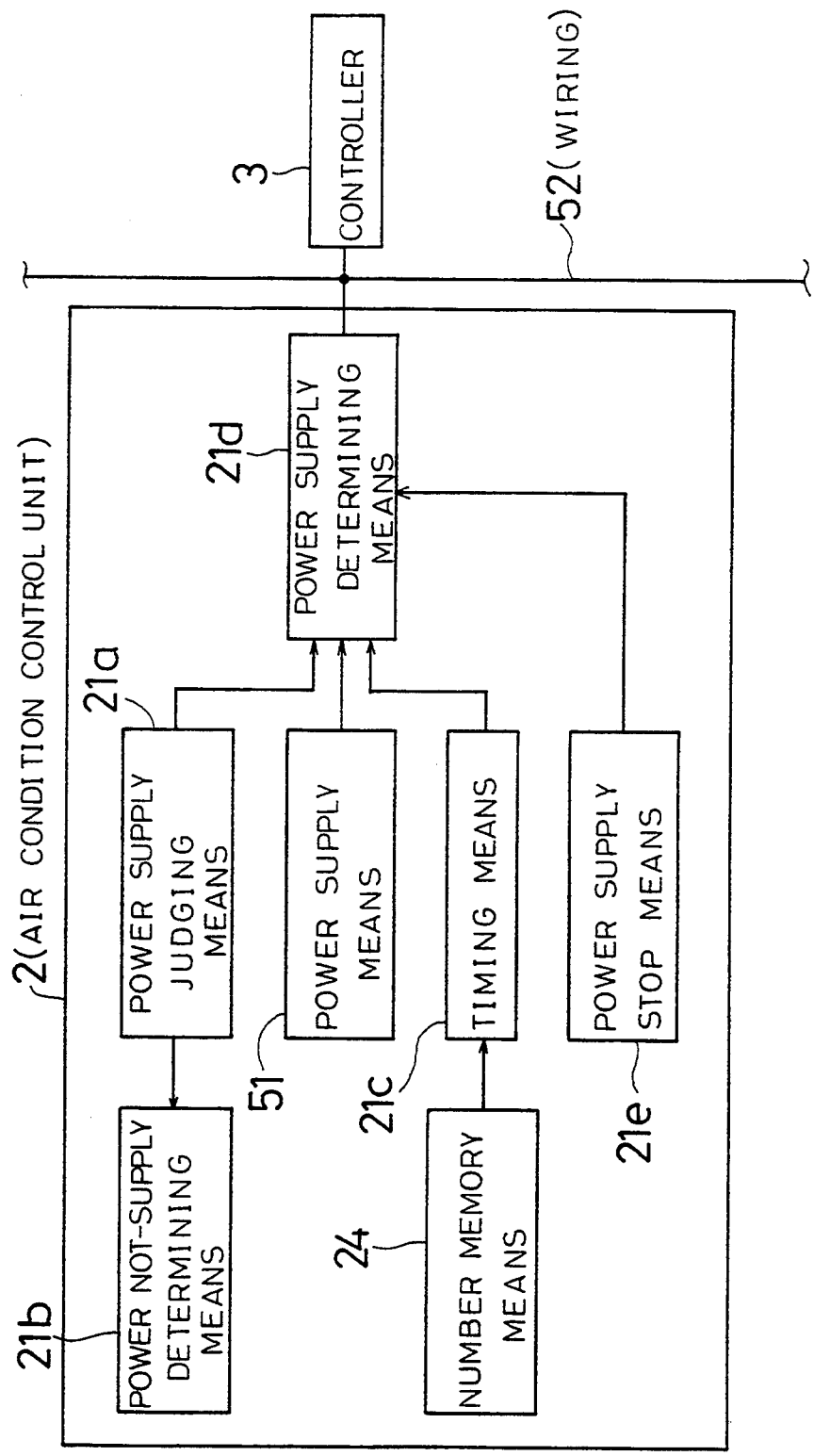
FIG. 1 is a block diagram showing a construction of the first electric power supply apparatus.
Figure 2:
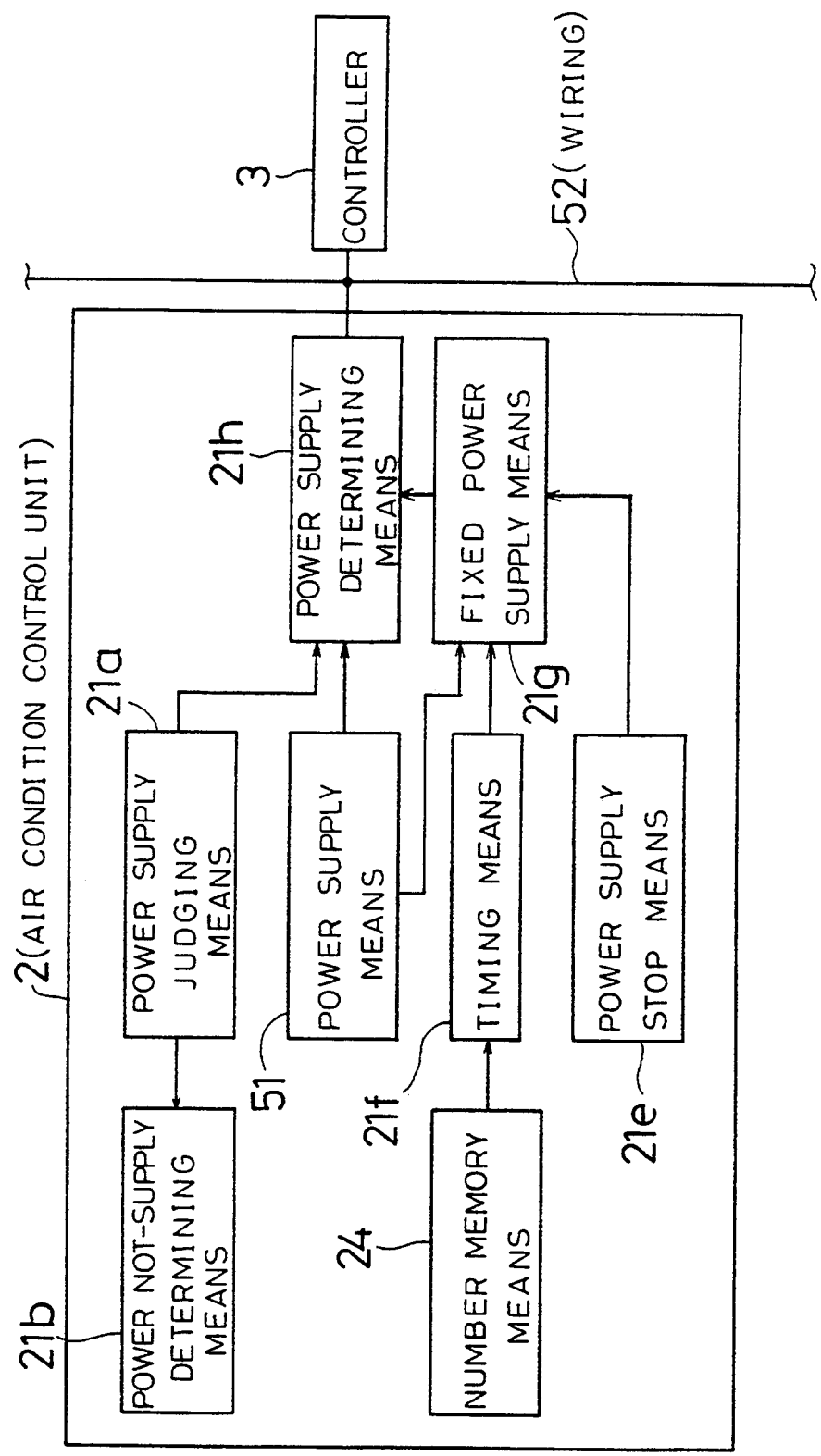
FIG. 2 is a block diagram showing a construction of the second electric power supply apparatus.
Figure 3:
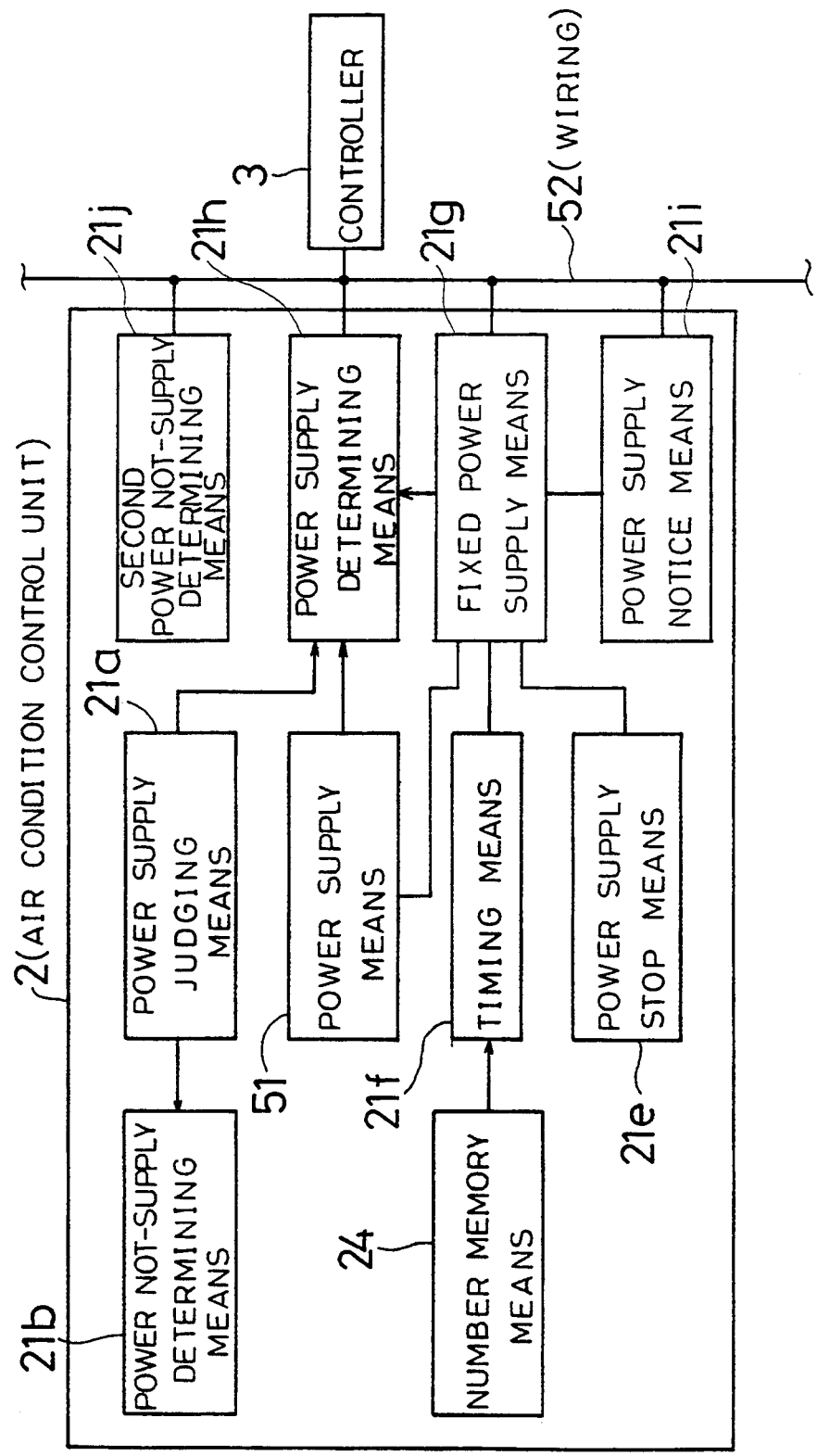
FIG. 3 is a block diagram showing a construction of the third electric power supply apparatus.
Figure 4:
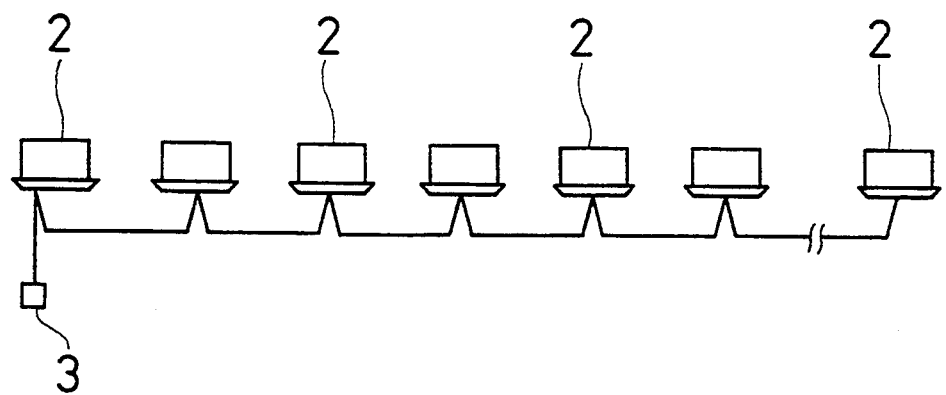
FIGS. 4–7 illustrate the first embodiment of the invention in more detail.
Figure 5:
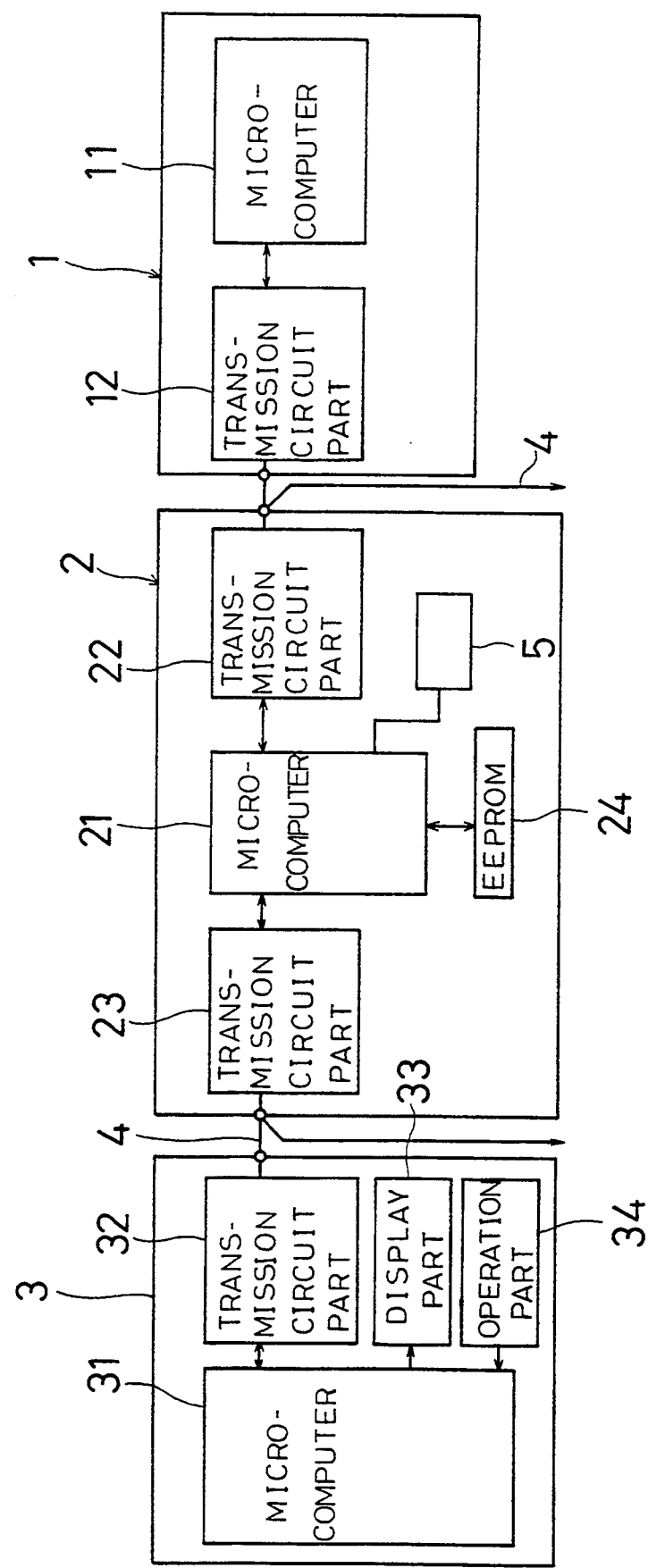

The following is a detailed description of the preferred embodiment of the present invention with reference to the accompanying drawings. As shown in FIGS. 4 and 5, reference numeral 1 indicates an outdoor control unit for controlling an outdoor unit and 2 indicates an indoor control unit for controlling an indoor air conditioning unit. The outdoor control unit 1 is connected to a plurality of indoor control units 2 and a single remote controller 3 is connected to a plurality of (at most sixteen) indoor control units 2 via transmission paths 4.

The outdoor control unit 1 has a micro-computer 11 and a transmission circuit 12 which is connected to the micro-computer 11. The transmission circuit 12 is connected to each indoor control unit 2 via the transmission paths 4 and communicates with the indoor control unit 2 receiving therefrom control signals like air conditioning load and the like.

Further, each indoor control unit 2 has a micro-computer 21 connected with transmission circuits 22 and 23, and, in turn, the transmission circuit 22 is connected to the outdoor control unit 1 via the transmission path 4, whereas the transmission circuit 23 is connected to the remote controller 3 via the transmission path 4 so that control signals of the indoor control unit 2, such as error signals or wind direction signals are sent and received between the indoor control unit 2 and the remote controller 3.

Furthermore, the remote controller 3 has a micro-computer 31 connected to a transmission circuit 32, to a display 33 which displays an operation or the like, and to an input means 34 which inputs operation signals. The transmission circuit 32 is in turn connected to each indoor control unit 2.

Figure 6:
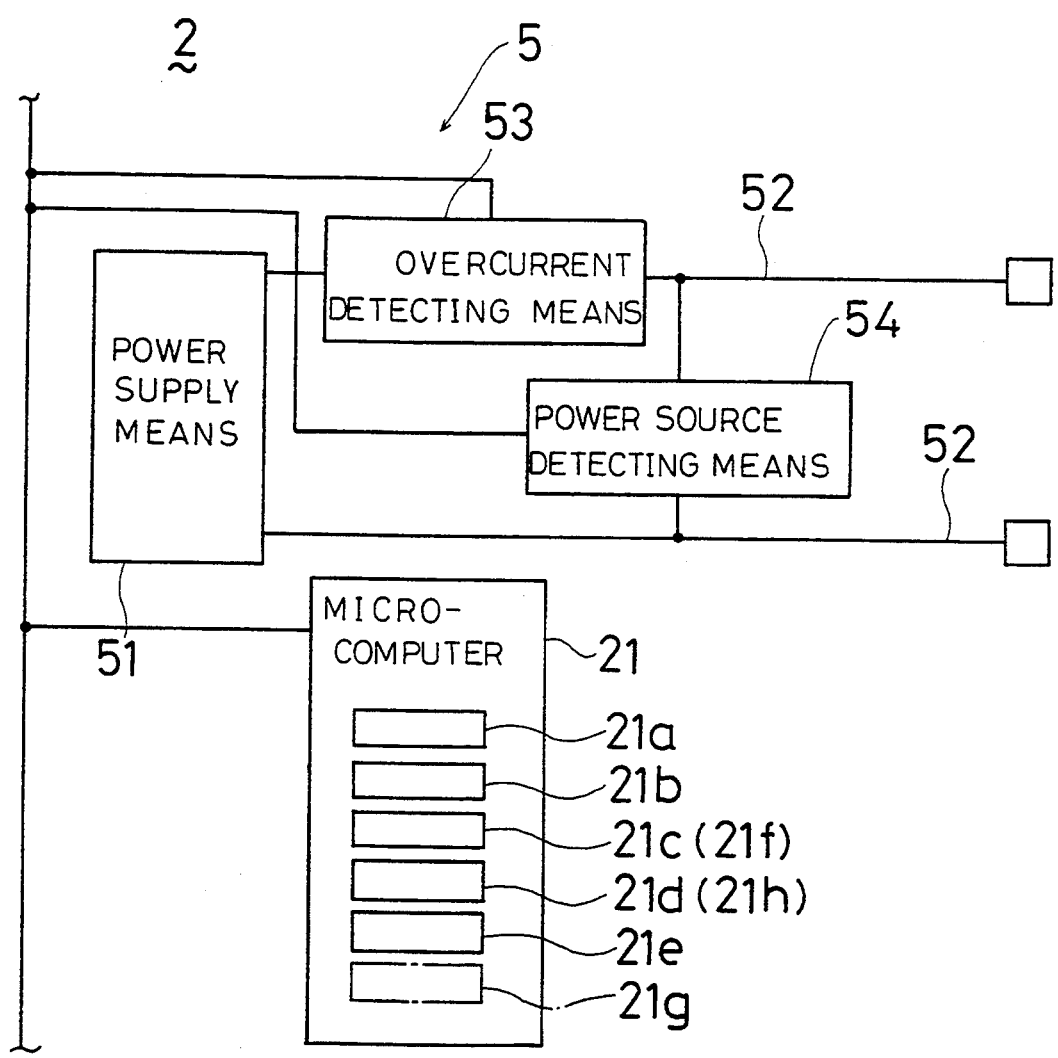

In addition, a power supply circuit 5 is provided at the indoor control unit 2, which includes, as shown in FIG. 6, power supply means 51 having a power storage element to be used for control operations. The power supply means 51 is connected to each indoor control unit 2 and the remote controller 3 via two power source wirings 52. The power source wirings 52 are connected to overcurrent detecting means 53, for detecting an overcurrent, and power source detecting means 54, for detecting power supply from the power supply means 51 to the remote controller 3. An EEPROM is provided at each indoor control unit 2, which includes number memory means 24 to store a pre-assigned number. The specific number is composed of 24 bits as a bit row of a set length. Different specific numbers are assigned to each indoor control unit at a given stage in the manufacturing process or when the unit is sent for shipment.

In addition, the first embodiment's power supply apparatus features a power supply judging means (or power-on means) 21a, power control means (or no-power-supply means) 21b, timing means 21c and power supply determining means (or power activation means) 21d which are provided in the micro-computer 21 of the indoor control unit 2. The power supply judging means (or power-on means) 21a monitors the power source wirings 52 in such a manner as to receive a detection signal from the power source detecting means 54, and detects whether another indoor control unit 2 is supplying electric power to the remote controller 3. The power control means (or no-power-supply means) 21b determines to not supply electric power to the remote controller 3 when the power supply judging means (or power-on means) 21a detects that electric power is being supplied to the remote controller 3. The timing means 21c sets a time for power supply to the remote controller 3 based on the pre-assigned specific number, which is, for example, calculated by multiplying such number by 10 ms. Moreover, when the power supply judging means (or power-on means) 21a detects that no power is supplied to the remote controller 3 at the time of power supply set by the timing means 21c, the power supply determining means (or power activation means) 21d enables the power supply to the remote controller 3, by activating the power supply means 51.

The power supply stop means (or power interrupting means) 21e resides in the micro-computer 21 of the indoor control unit 2 and is designed to interupt the power supply when it receives an overcurrent signal from the overcurrent detecting means 53, which is when it detects a connection error due to heteropolarity (i.e. cross polarization).

Figure 7:
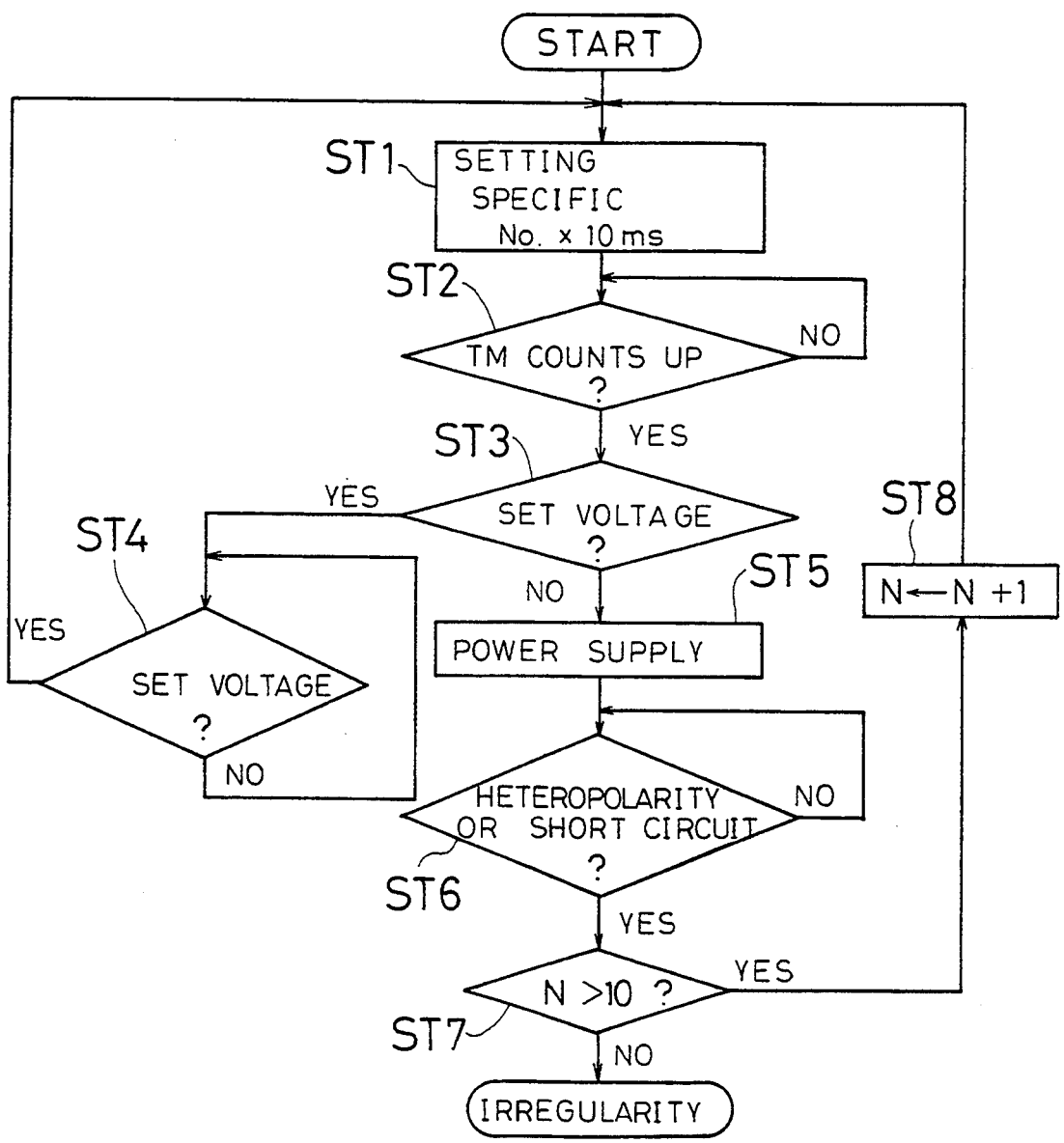

The following is a description of a power supply operation from the indoor control unit 2 to the remote controller 3 for the first embodiment, and which is illustrated in FIG. 7. When the power source is turned ON, an error count N is initially set to 0. At a step ST1, a specific number of the indoor control unit is read out from an EEPROM 24 and a time TM for a power supply time is set by multiplying the specific number by 10 ms.

Then, the routine proceeds to a step ST2 and examines whether the time of the timer TM has been reached. The routine is kept waiting at the step ST2 until the time is reached. Then, the routine proceeds to a step ST3, where the routine determines, through a signal from the power source detecting means 54, whether the remote controller 3 has a set voltage; that is, whether it is receiving power from another control unit 2. At this point, if it is detected that the remote controller 3 is being powered, the unit is not enabled to supply electric power to the controller 3 and an AFFIRMATIVE flag is turned on that allows the routine to proceed to step ST4.

At the step ST4, the routine determines whether the remote controller 3 has a set voltage by receiving a detection signal from the power source detecting means 54. If the remote controller 3 has a set voltage, the routine is kept waiting at the ST4. If the remote controller 3 does not have the set voltage due to a stop of the power supply, the routine returns to step ST1.

At the step ST3, when a set low voltage is detected so that the routine determines that the remote controller 3 is not being powered, a NEGATIVE flag is enabled and the unit 2 is activated to supply electric power to the remote controller 3. Then, the routine proceeds to a step ST5, where the power supply means 51 supplies power to the remote controller 3 which allows a signal to be sent and received between each indoor control unit 2 and the remote controller 3.

Then, the routine proceeds from the step ST5 to step ST6, where it determines whether there is any irregularity in the power supply, such as heteropolarity (i.e. cross polarity) or a short circuit detected by the overcurrent detecting means 53. Specifically, an overcurrent is created when the remote controller's 3 power supply source is heteropolar, or cross polarized, due to a connection error. When no heteropolarity is detected, the routine is kept waiting at step ST6. Conversely, when heteropolarity is detected, the routine proceeds from step ST6 to step ST7. At step ST7, the routine determines whether the error count N is not more than ten. When the error count N is more than ten, the routine proceeds to a step ST8. At the step ST8, the routine returns to the step ST1 by increasing the error count N by one. Thereafter, the above-mentioned operation is repeated and when the error count N is more than ten, a NEGATIVE flag is enabled at step ST7, so that an operation for irregularity is executed, and the power is turned off.

The first embodiment ensures that power be supplied steadily to the remote controller 3 due to the pre-assignment of numbers to each of the indoor control units. Communication is therefore effectively initiated between the remote controller 3 and each indoor control unit 2. Consequently, the address of the indoor control unit 2 can be automatically set and the printed circuit boards of indoor control units 2 can be standardized, thus facilitating the production of the indoor control units 2.

Figure 9:
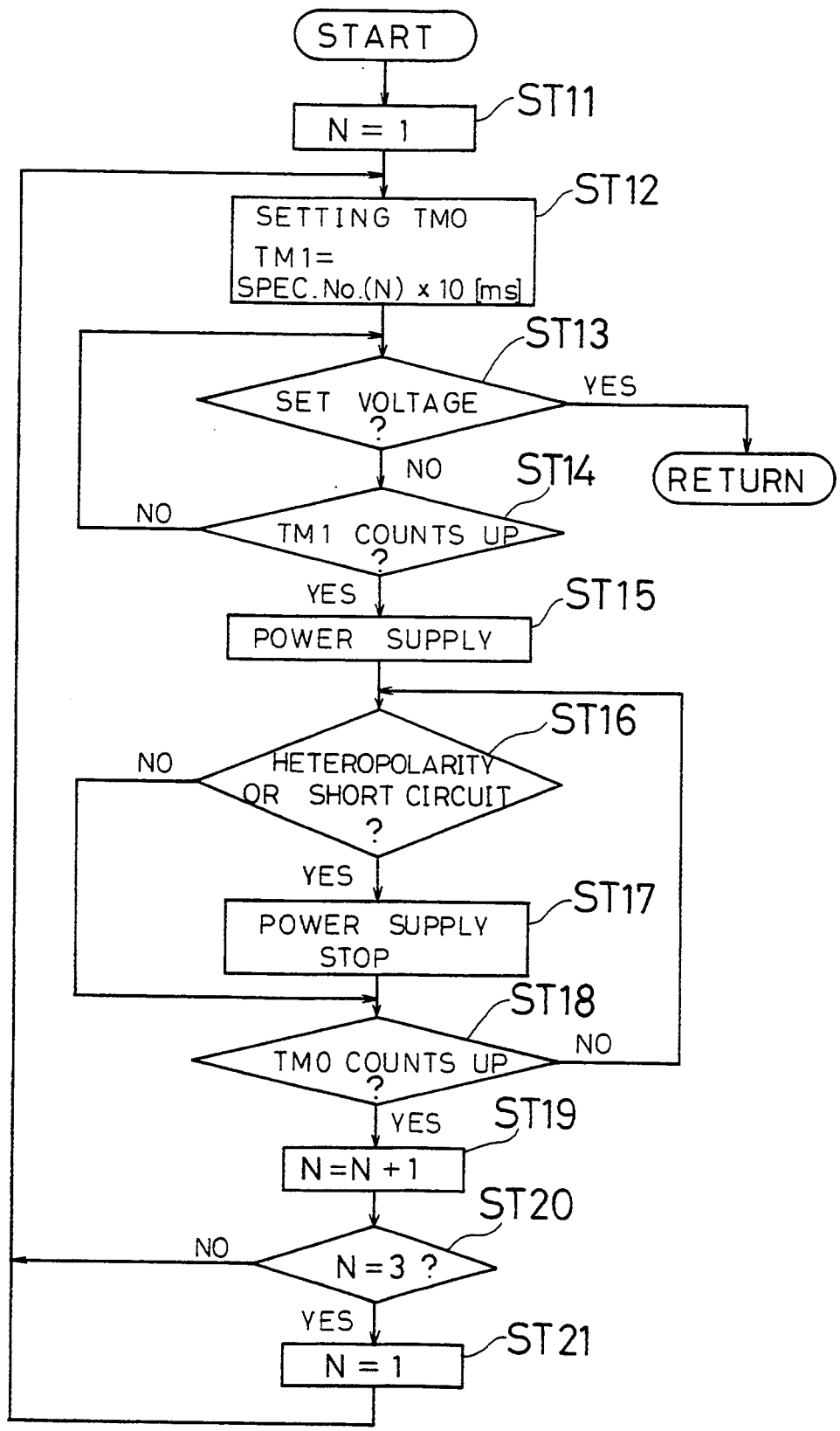

FIG. 9 shows a control flow of a power supply apparatus according to a second embodiment. In this embodiment, as shown in FIG. 6, a different timing means 21f is used in place of timing means 21c provided in the first embodiment. In addition, a fixed power supply means 21g and power supply determining means (or power activation means) 21h are provided instead of the power supply determining means (or power activation means) 21d of the first embodiment.

Figure 8:
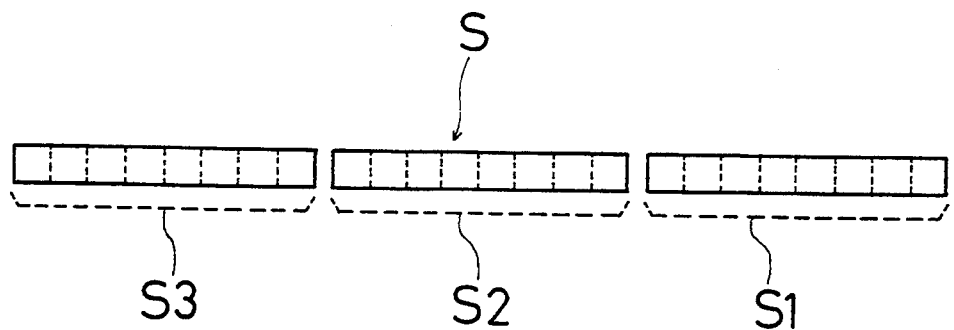
FIGS. 8 and 9 illustrate a second embodiment of the invention.

As shown in FIG. 8, the timing means 21f sets three different times for power supply designated by sectional numbers S1, S2 and S3, which are assigned to respective sectional bit codes into which the specific number S is divided per byte. In the first embodiment, the time of power supply based on the specific number itself becomes fairly long. Therefore, the times of power supply in this embodiment are reduced by dividing the sectional numbers S1–S3 per byte.

The fixed power supply means 21g enables the power supply means 51 to supply electric power to the remote controller 3 at each of power supply times set by the timing means 21c. The power supply determining means (or power activation means) 21h enables the supply of electric power to the remote controller 3 when the fixed power supply means 21g properly supplies the power as per the sectional numbers S1–S3.

FIG. 9 shows a flow diagram representing a power supply operation of the air conditioning indoor control unit 2 to power the remote controller 3 in accordance with a second embodiment of the present invention. When the power source is turned ON, a count N for sectional number is set to 1 at a step ST11, which is specifically set so that power is supplied as dictated by the first byte of the pre-assigned specific number. Then, when the routine proceeds to a step ST12, a fixed timer TM0 is set to a fixed time and a power supply timer TM1 is set to a time of power supply which is operated by multiplying the sectional number S1 of the first byte of the specific number by 10 ms.

Subsequently, the routine proceeds to a step ST13 to determine whether the power source wiring 52 has a set voltage. This is done by receiving a detection signal from the power source detecting means 54 which determines whether electric power is being supplied from another indoor control unit 2 to the remote controller 3. When the power source wiring 52 has a set voltage, which means that the remote controller 3 is being powered by another control unit 2, the control unit 2 is not enabled to supply electric power to the controller 3 and the routine returns to its main flow without supplying electric power to the remote controller 3.

Conversely, at step ST13, when the power source wiring 52 does not have a set voltage, the remote controller 3 is not receiving electric power and the routine proceeds to step ST14. At step ST14, the routine determines whether the time of the power supply timer TM1 has been reached based on the sectional number S1 of the first byte of the pre-assigned control unit 2 specific number. Subsequently, the routine returns to step ST13 until the time of the power supply timer TM1 has been reached. At this time and, as long as no other indoor control units 2 supply electric power, the routine proceeds from the step ST14 to a step ST15, and the fixed power supply means 21g begins to supply electric power.

At this point, the routine proceeds to step ST16 where it determines whether the power source is heteropolar (i.e. cross polarized) or whether the power source is short-circuited. Specifically, as in step ST6 in the first embodiment, the routine determines whether the power source is heteropolar by receiving the detection signal from the overcurrent detecting means 53. When the power source is heteropolar, the routine proceeds from step ST16 to step ST17, where the power supply stop means (or power interrupting means) 21e disables the power supply of the fixed power supply means 21g and the routine proceeds directly to step ST18, without going through step ST17. If no heteropolarity is detected, the routine proceeds from the step ST16 to step ST18.

At the step ST18, the routine determines whether the time of the fixed timer TM0 has been reached. Specifically, it determines whether the fixed power supply means 21g supplies electric power for a given pre-arranged time. The routine returns to step ST16 until the time of the fixed timer TM0 is reached, and then the routine proceeds from step ST18 to step ST19. Subsequently, the count N of the sectional number increases by one and the routine proceeds to step ST20, where the routine determines whether the count N of the sectional number is 3. Specifically, the routine determines whether electric power is supplied based on each one of sectional numbers formed from three bytes in the specific number. At this point, the electric power is supplied as per the sectional number S1 of the first byte, and the routine returns from step ST20 to step ST11 in order to supply electric power based on the sectional number S2 of a second byte. Thereafter, the same operation is executed for the sectional number S2 of the second byte. When another indoor control unit 2 supplies electric power prior to the S2 power supply, the routine determines that the S2 unit will not supply electric power.

When the above-mentioned operation has been executed for each of the three bytes sectional numbers S1–S3 of the pre-assigned control units 2 specific numbers, and when the power supply terminates without irregularities, the routine proceeds to step ST21. At this point, the count N for sectional number returns to 1 so that the routine returns to step ST11. Then, the unit is enabled to supply electric power from the power supply means 51 to the remote controller 3.

Further, if heteropolarity of the power source is detected at step ST17, the routine returns from step ST21 to step ST12 and electric power is supplied repeatedly based on each of three bytes of the sectional numbers S1–S3.

Therefore, as in the first embodiment, each address of the indoor control unit 2 can be automatically set, and printed circuit boards of the air conditioning control units 2 can be standardized. Further, the control unit 2 designated to supply electric power to the remote controller 3 can be timely selected, since the time of power supply is set by means of dividing the specific pre-assigned number into plural sections.

Figure 10:
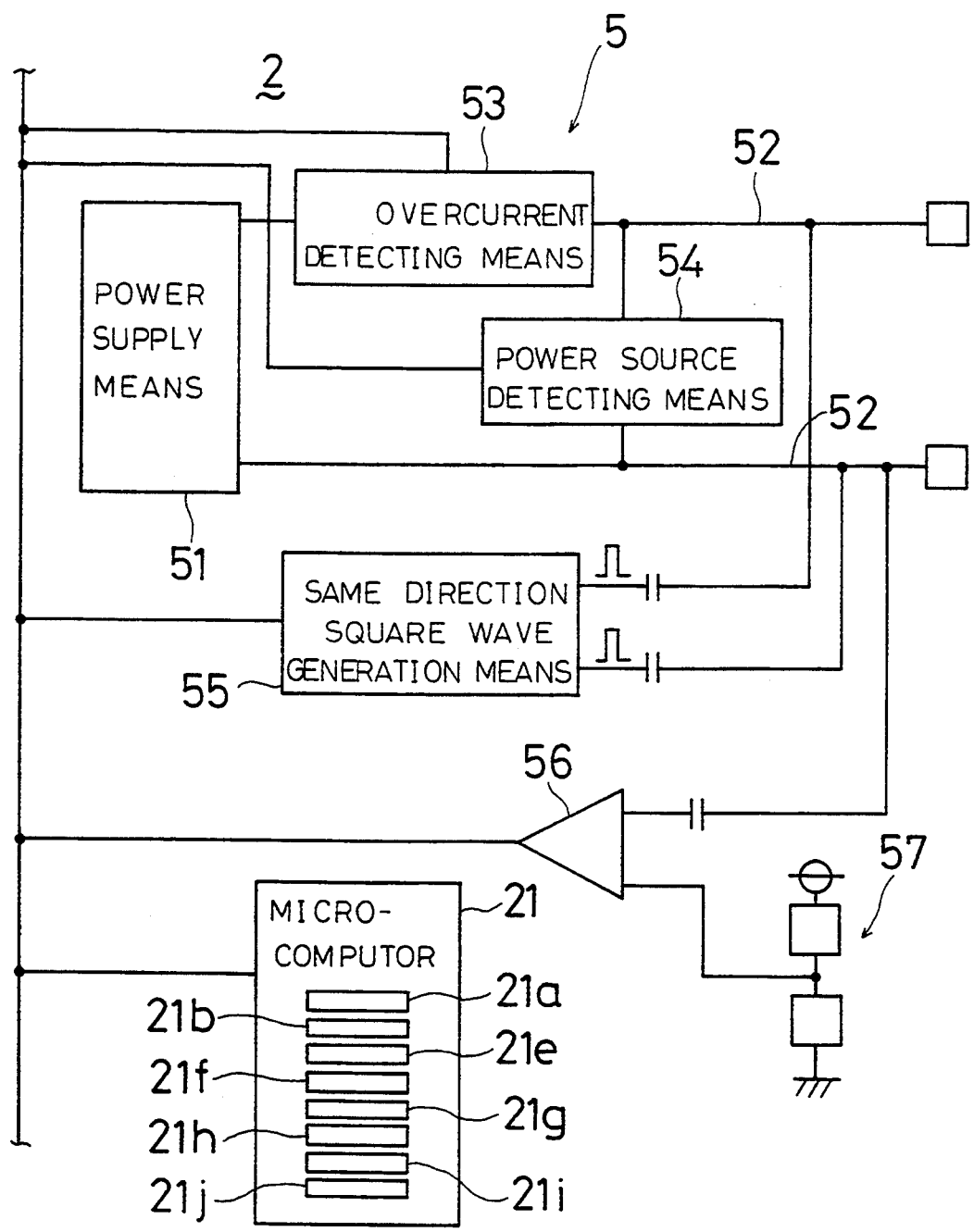
FIGS. 10–13 illustrate a third embodiment of the invention.
Figure 13:
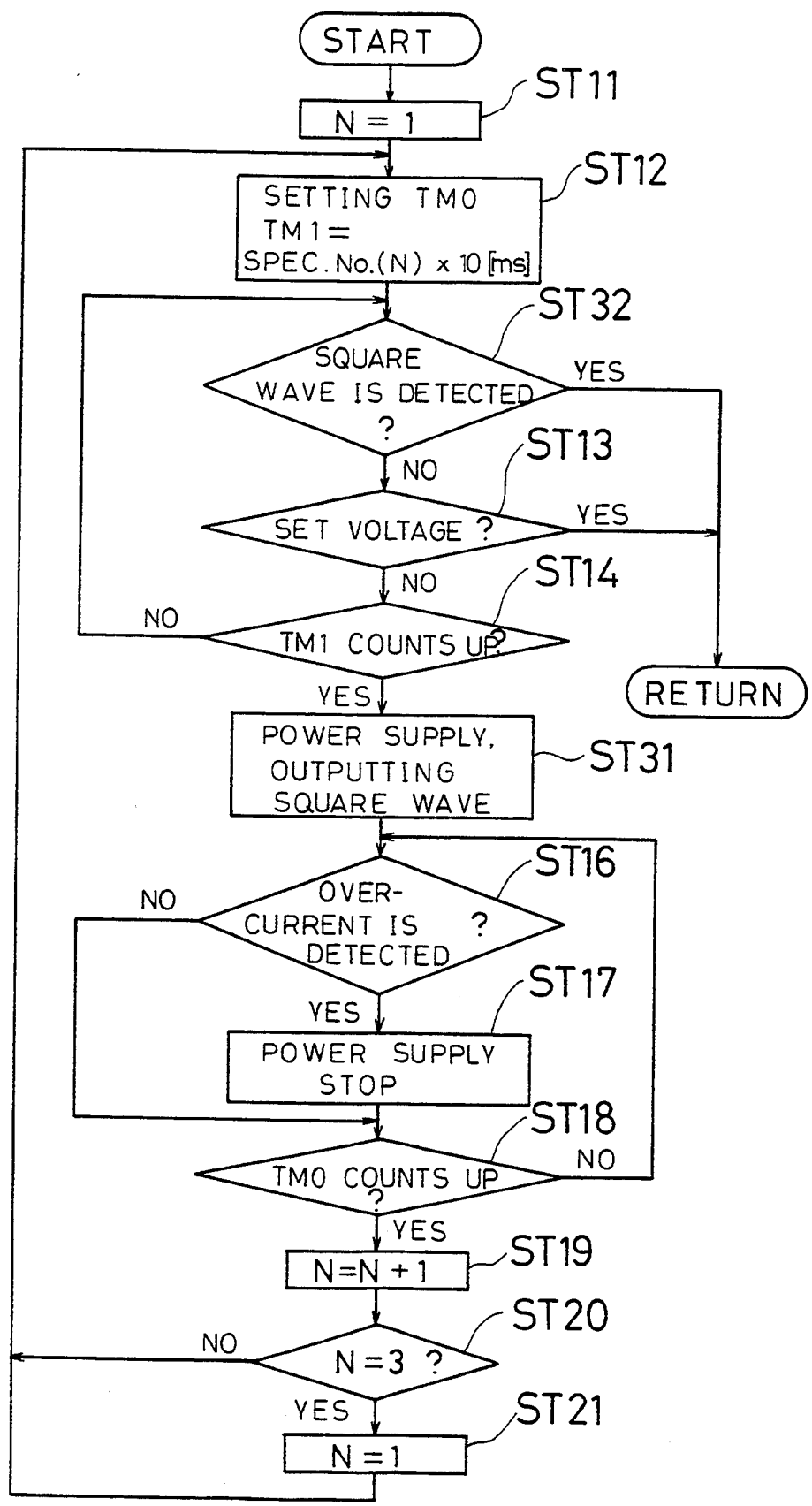

FIG. 13 shows a control flow of an electric power supply apparatus according to a third embodiment. This embodiment, as shown in FIG. 10, features power supply notice means 21i and a second power control means (or no-power-supply means) 21j, in addition to the apparatus provided in the second embodiment. The power control means (or no-power-supply means) 21b in the second embodiment is the first power control means (or no-power-supply means) 21b of this embodiment.

The power supply circuit 5 has square wave generation means 55 connected between power source wirings 52 and the micro-computer 21, and it also features a comparator 56. The square wave generation means 55 generates square waves (notice signals) with a previously set voltage in the same direction. The comparator 56 is connected to reference voltage generation means 57. When another indoor control unit 2 outputs a square wave as a notice signal, the comparator 56 detects the notice signal and sends a detection signal to the microcomputer 21.

The power supply notice means 21i sends the notice signal to the square wave generation means 55 when the fixed power supply means 21g supplies electric power. The second power control means (or no-power-supply means) 21j determines to not supply electric power to the remote controller 3 when another indoor control unit 2 receives a notice signal from the comparator 56.

Figure 11:
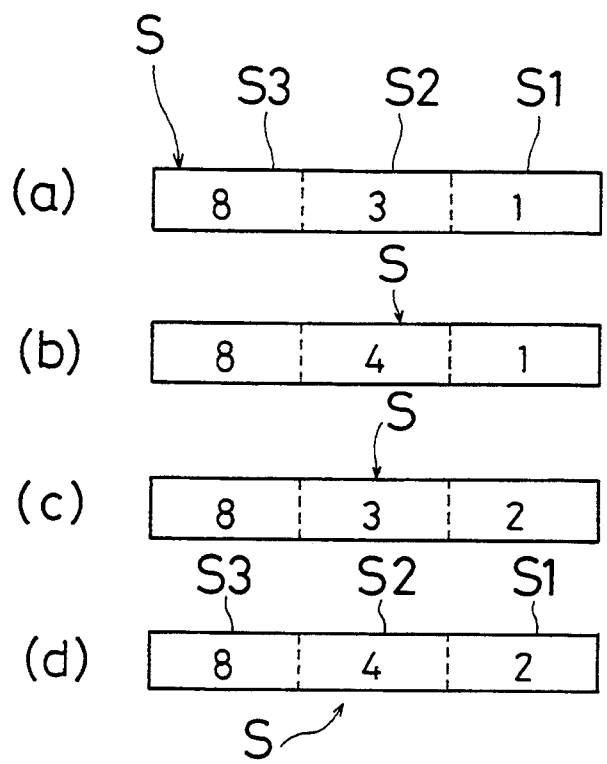
Figure 12:
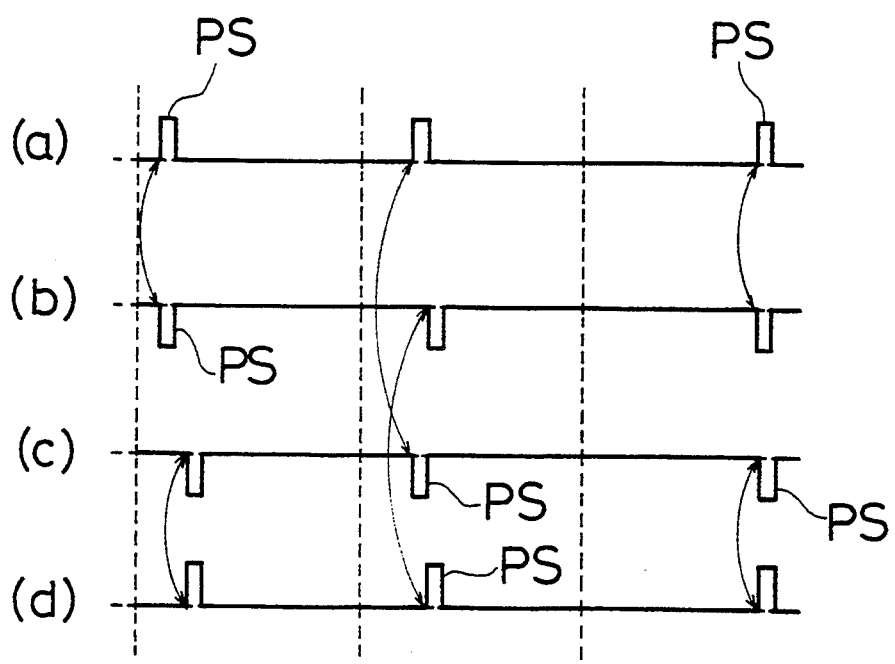

As in the second embodiment, when the specific number S is divided into three sectional numbers S1–S3, the possibility of simultaneous enabling of control units 2 to supply electric power may arise, during the number selection of the three sectional numbers by the fixed power supply means 21g. Specifically, there may be a case that four indoor control units 2 have different specific numbers S from one another, wherein the first indoor control unit 2 shown in FIG. 11(a) and the fourth indoor control unit 2 shown in FIG. 11(d) are connected to a positive polarity, while the second indoor control unit 2 shown in FIG. 11(b) and the third indoor control unit 2 shown in FIG. 11(c) are connected to a negative polarity. As shown in FIG. 12, when the first indoor control unit 2 and the second indoor control unit 2 execute respective power supplies PS as per respective sectional numbers S1 of the first byte, these power supplies PS are simultaneously enabled, thus colliding with each other. Then, regarding the first byte, the power supply of the third indoor control unit 2 collides with that of the fourth indoor control unit 2. Regarding the second byte, the power supply of the first indoor control unit 2 collides with that of the third indoor control unit 2, and the power supply of the second indoor control unit 2 collides with that of the fourth indoor control unit 2. Regarding the third byte, the power supply of the first indoor control unit 2 collides with that of the second indoor control unit 2 and the power supply of the third indoor control unit 2 collides with that of the fourth indoor control unit 2.

Therefore, when the power supply stop means (or power interrupting means) 21e detects each collision of the power supplies PS and the fixed power supply means 21g it repeats the power supply PS based on the time of power supply of the timing means 21f, and the unit for supplying electric power may not be determined. To meet the above situation, the above-mentioned square wave is sent as a notice signal so that an indoor control unit's 2 power supply PS is selected to supply electric power with respect to each byte.

FIG. 13 illustrates a flow chart of a power supply operation from an indoor air conditioning control unit 2 to the remote controller 3. The operation of the power supply in this embodiment has a step ST31 instead of the step ST15 of the second embodiment, and a step ST32 provided between the step ST12 and the step ST13. The other procedures are the same as in the second embodiment.

Specifically, at step ST31, when the fixed power supply means 21g begins to supply electric power, the square wave generation means 55 outputs a notice signal of a square wave. With the notice signal, the other indoor control units can detect that a single indoor control unit 2 has started supplying power to the remote controller 3.

At step ST32, the routine determines whether another indoor control unit 2 is sending the notice signal, based on the detection signal from the comparator 56. If so, the unit is not enabled to supply electric power and the routine returns to a main flow without powering the remote controller 3. When no other indoor control units 2 send the notice signal, the routine begins at step ST13.

As shown in FIG. 12, when the power supplies PS begin supplying power simultaneously, the indoor control units 2 shown in FIG. 12(c) and FIG. 12(d), which enable power supplies PS as per the sectional numbers S1 at the first byte, are deemed to be units which will not supply electric power as per the notice signals sent from the indoor control units 2 and shown in FIG. 12(a) and FIG. 12(b). The indoor control unit 2 shown in FIG. 12(b), which enables the power supplies PS as per the sectional numbers S2 at the second byte, is deemed to be a unit which does not supply electric power according to the notice signal from the indoor control unit 2 shown in FIG. 12(a), so that a single indoor control unit 2 is determined to be a unit which supplies the power.

Therefore, as in the second embodiment, each address of the indoor control unit can be automatically set, and printed circuit boards of the air conditioning control units 2 can be standardized. Further, since the power supply is identified, the unit supplying power can be determined without error, based on a difference between the specific numbers even if the power supply of the fixed power supply means 21g supplies power simultaneously with another indoor control unit 2.

It should be noticed that the embodiments described above can apply to any supply of power from an air conditioning control unit to a controller. Also, the time at which the controller shall be powered is not restricted to the time mathematically obtained by multiplying the sectional number by 10 ms.

Industrial Applicability

This invention is advantageous to standardize the power supplied from an air conditioning control unit to a remote controller, since the air conditioning control unit for supplying electric power to a controller is automatically predetermined.

We claim:

1. In an air conditioning control machine in which a plurality of air conditioning control units are connected to a single controller through wirings and air conditioning operation is controlled by sending and receiving a control signal between the controller and the air conditioning control unit, an electric power supply apparatus of the air conditioning control machine including said air conditioning control units comprising:
    number memory means for previously storing different specific numbers in each air conditioning control unit;
    power supply means for supplying electric power;
    power supply judging means for detecting whether another air conditioning control unit is supplying electric power to the controller by monitoring the wirings;
    power control means for determining to not supply electric power to the controller when the power supply judging means detects that the controller receives power;
    timing means for setting a power supply time based on the specific number; and
    power supply determining means for determining to supply electric power to the controller when the power supply judging means detects that the controller receives no power at the power supply time and for controlling the power supply means to supply power to the controller.

2. In an air conditioning control machine in which a plurality of air conditioning control units are connected to a single controller through wirings and air conditioning operation is controlled by sending and receiving a control signal between the controller and the air conditioning control unit, an electric power supply apparatus of the air conditioner including said air conditioning control units comprising:
    number memory means for previously storing different specific numbers in each air conditioning control unit;
    power supply means for supplying electric power;
    power supply judging means for detecting whether another air conditioning control unit is supplying electric power to the controller by monitoring the wirings;
    power control means for determining to not supply electric power to the controller when the power supply judging means detects that the controller receives power;
    timing means for setting power supply times based on each of plural sectional numbers resulting from the division of the specific number;
    fixed power supply means for controlling the power supply means to supply power to the controller at the power supply times; and
    power supply determining means for determining to supply electric power to the controller when the fixed power supply means enables the power supply means with respect to all sectional numbers.

3. The electric power supply apparatus of the air conditioner according to claim 1 or 2, further comprising power supply interruption means for interrupting the power supply when an irregularity of a power source is detected by monitoring the wirings.

4. In an air conditioning control machine in which a plurality of air conditioning control units are connected to a single controller through wirings and air conditioning operation is controlled by sending and receiving a control signal between the controller and the air conditioning control unit, an electric power supply apparatus of the air condition control machine including said air conditioning control units comprising:
    number memory means for previously storing different specific numbers in each air conditioning control unit;
    power supply means for supplying electric power;
    power supply judging means for detecting whether another air conditioning control unit is supplying electric power to the controller by monitoring the wirings;
    first power control means for determining to not supply electric power to the controller when the power supply judging means detects that the controller receives power;

timing means for setting power supply times based on each of plural sectional numbers resulting from the division of the specific number;

fixed power supply means for controlling the power supply means to supply power to the controller at the power supply times;

power supply notice means for providing a notice signal of a set voltage when the fixed power supply means begins to supply power;

second power control means for determining to not supply electric power to the controller when a notice signal from another air conditioning control unit is detected by monitoring the wirings;

power supply interruption means for interrupting the power supply from the fixed power supply means at a predetermined time when an irregularity of a power source is detected by monitoring the wirings; and power supply determining means for determining to supply electric power to the controller when the fixed power supply means enables a normal power supply with respect to all sectional numbers.

* * * * *